United States Patent
Yan

(10) Patent No.: US 10,089,943 B2
(45) Date of Patent: Oct. 2, 2018

(54) LIQUID CRYSTAL DISPLAY PANEL DRIVING METHOD, TIMING CONTROLLER AND LIQUID CRYSTAL DISPLAY APPARATUS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Long Yan, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/541,423

(22) PCT Filed: Jan. 6, 2017

(86) PCT No.: PCT/CN2017/070381
§ 371 (c)(1),
(2) Date: Jul. 3, 2017

(87) PCT Pub. No.: WO2017/173869
PCT Pub. Date: Oct. 12, 2017

(65) Prior Publication Data
US 2018/0047351 A1  Feb. 15, 2018

(30) Foreign Application Priority Data

Apr. 8, 2016 (CN) .......................... 2016 1 0218020

(51) Int. Cl.
*G09G 3/36* (2006.01)
*G02F 1/1362* (2006.01)
(Continued)

(52) U.S. Cl.
CPC .......... *G09G 3/3607* (2013.01); *G02F 1/1343* (2013.01); *G02F 1/13306* (2013.01); *G02F 1/136286* (2013.01)

(58) Field of Classification Search
CPC .......... G09G 5/00; G09G 3/3614; G09G 3/36; G09G 3/3674
See application file for complete search history.

(56) References Cited

U.S. PATENT DOCUMENTS

2011/0273463 A1  11/2011  Lee et al.
2012/0268444 A1*  10/2012  Takahashi ............ G09G 3/3614
                                               345/212
(Continued)

FOREIGN PATENT DOCUMENTS

CN  101211029 A  7/2008
CN  102376279 A  3/2012
(Continued)

OTHER PUBLICATIONS

International Search Report and Written Opinion in PCT/CN2017/070381 dated Mar. 28, 2017, with English translation.
(Continued)

*Primary Examiner* — Michael Faragalla
(74) *Attorney, Agent, or Firm* — Womble Bond Dickinson (US) LLP

(57) ABSTRACT

A method is disclosed for driving a liquid crystal display panel. The liquid crystal display panel is configured to display a sequence of image frames including a plurality of alternating first frame groups and second frame groups. The method includes modulating grayscale voltage polarities for each of the plurality of second frame groups, including: dividing each of the image frames in the second frame group into a first region and a second region; setting the grayscale voltage polarities for the first region to be opposite to the grayscale voltage polarities for the second region; and modulating the grayscale voltage polarities for the image frames in the second frame group such that every two successive image frames in the second frame group have respective grayscale voltage polarity patterns that are opposite to each other. Also disclosed are a timing controller and a liquid crystal display apparatus.

17 Claims, 4 Drawing Sheets

(51) Int. Cl.
    *G02F 1/1343*    (2006.01)
    *G02F 1/133*    (2006.01)

(56)         References Cited

U.S. PATENT DOCUMENTS

2015/0002492 A1*  1/2015  Fujioka ................ G09G 3/3614
                                                        345/204
2016/0012789 A1    1/2016  Miyazawa et al.
2017/0236483 A1    8/2017  Guo et al.

FOREIGN PATENT DOCUMENTS

CN       102831869 A   12/2012
CN       104081445 A   10/2014
CN       105096873 A   11/2015
CN       105096878 A   11/2015
CN       105654917 A    6/2016
JP       2009300781 A  12/2009
KR      1020110123473 A 11/2011

OTHER PUBLICATIONS

Office Action in Chinese Application No. 201610218020.5 dated Sep. 1, 2017, with English translation.

* cited by examiner

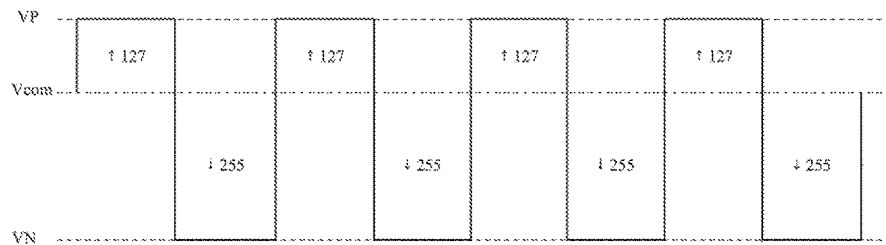
FIG. 4
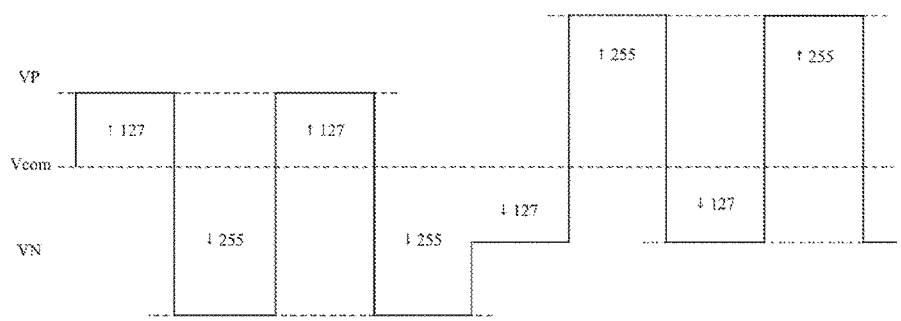
FIG. 5
| Frame | 1 | 2 | 3 | 4 | 5 | 6 | 7 | 8 |
|---|---|---|---|---|---|---|---|---|
| Pixel Luminance | P127 | N255 | P127 | N255 | P127 | N255 | P127 | N255 |
| Average Luminance | (P127+N255)/2 | | (P127+N255)/2 | | (P127+N255)/2 | | (P127+N255)/2 | |
| | | (N255+P127)/2 | | (N255+P127)/2 | | (N255+P127)/2 | | |
FIG. 6A

| Frame | 1 | 2 | 3 | 4 | 5 | 6 | 7 | 8 |
|---|---|---|---|---|---|---|---|---|
| Pixel Luminance | P127 | N255 | P127 | N255 | N127 | P255 | N127 | P255 |
| Average Luminance | | (P127+N255)/2 | | (P127+N255)/2 | | (N127+P255)/2 | | (N127+P255)/2 |
| | | | (N255+P127)/2 | | (N255+N127)/2 | | (P255+N127)/2 | |

FIG. 6B

| Frame | 1 | 2 | 3 | 4 | ... | n | n+1 | n+2 | n+3 | n+4 | n+5 | n+6 | ... | 2n+2 |
|---|---|---|---|---|---|---|---|---|---|---|---|---|---|---|
| POL | P | N | P | N | P | N | P N ... P N | N P ... N P | N | P | N | P | N | P |

Frame Group #1 : frames 1..n
Frame Group #2 : frames n+1, n+2
Frame Group #1 : frames n+3..2n+2

FIG. 7

| | n+1 | n+2 |
|---|---|---|
| 1st sub-region | P | N |
| 2nd sub-region | N | P |
| 1st sub-region | P | N |
| 2nd sub-region | N | P |
| ... | ... | ... |
| 1st sub-region | P | N |
| 2nd sub-region | N | P |
| 1st sub-region | P | N |
| 2nd sub-region | N | P |

LIQUID CRYSTAL DISPLAY PANEL DRIVING METHOD, TIMING CONTROLLER AND LIQUID CRYSTAL DISPLAY APPARATUS

CROSS-REFERENCE TO RELATED APPLICATIONS

The present application is the U.S. national phase entry of PCT/CN2017/070381, with an international filing date of Jan. 6, 2017, which claims the benefit of Chinese Patent Application No. 201610218020.5, filed on Apr. 8, 2016, the entire disclosures of which are incorporated herein by reference.

TECHNICAL FIELD

The present disclosure relates to the field of display technologies, and particularly to a method for driving a liquid crystal display panel, a timing controller, and a liquid crystal display apparatus.

BACKGROUND

A liquid crystal display panel includes a plurality of rows of scan lines, a plurality of columns of data lines, and a plurality of pixels defined by the scan lines and the data lines. When the liquid crystal display panel is driven to display an image, the plurality of rows of scan lines are sequentially scanned, and the plurality of columns of data lines are applied with respective grayscale voltages. In an application where an interlaced scanning video signal is provided by a signal source, de-interlacing processing may be required. By means of the de-interlacing processing, missed image information of odd (even) image frames in the interlaced scanning video signal is reconstructed such that each of the odd (even) image frames becomes a complete image frame.

In addition, a polarity for the grayscale voltage applied to each of the plurality of pixels of the liquid crystal display panel is inverted frame by frame. FIG. 1 shows examples of various schemes for grayscale voltage polarity inversion. As shown in FIG. 1, the polarity inversion typically includes frame inversion, column inversion, row inversion and dot inversion, with the odd frame and the even frame having respective grayscale voltage polarity patterns that are opposite to each other. By way of the polarity inversion, a direct current bias of the liquid crystal in a long period of time may be removed, thereby preventing the liquid crystal from being overly polarized and thus avoiding artifacts.

SUMMARY

The Inventors of the present disclosure has recognized that in spite of introduction of the polarity inversion, the artifacts may still occur in some cases, for example, when the de-interlacing processing is performed for the interlaced scanning video signal. This may arise from the fact that the reconstructed grayscale data derived from the de-interlacing processing is unequal to the real grayscale data.

Referring to FIG. 2, it shows an example of an interlaced scanning video signal for the same column of pixels in eight pixel lines (Lines 1 to 8) in successive eight frames (Frames 1 to 8). As is known, for the interlaced scanning video signal, each image frame has only a half of data amount of a complete frame. In this example, the odd frames have the grayscale data of odd rows, and the even frames have the grayscale data of even rows. The missed, remaining half of data for each image frame can be calculated from a reconstruction algorithm for de-interlacing processing.

FIG. 3 shows an example of a reconstructed interlaced scanning video signal. The reconstruction algorithm may be formulated as follows: the grayscale data of a missed intermediate row equals an average of the grayscale data of a preceding row and the grayscale data of a succeeding row, and the grayscale data of a missed edge row equals the grayscale data of an adjacent row. Although being able to complement the data of each image frame, the de-interlacing processing may lead to inequality between the reconstructed grayscale data and the real grayscale data at some pixel lines. As indicated by the bold boxes in FIG. 3, the real grayscale data for the pixels of the fourth line in the odd frames should be 255, but the reconstructed grayscale data is 127; the real grayscale data for the pixels of the fifth line in the even frames should be 0, but the reconstructed grayscale data is 127.

FIG. 4 shows an example where a direct current bias is caused by the inequality between the reconstructed grayscale data and the real grayscale data. As described above, when the liquid crystal display panel is in operation, the polarity for the grayscale voltage applied to each pixel is inverted frame by frame. Taking the pixels of the fourth line as an example, assume that the grayscale voltages applied to the pixels in the period of odd frames (corresponding to the reconstructed grayscale data) have a positive polarity (P) with respect to a common voltage Vcom, and that the grayscale voltages applied to the pixels in the period of even frames (corresponding to the real grayscale data) have a negative polarity (N) with respect to the common voltage Vcom. As the grayscale voltages VP for the odd frames are smaller than the absolute values of the grayscale voltages VN for the even frames, a direct current bias may have occurred, resulting in polarization of the liquid crystal.

The Inventors have further recognized that the issue of the direct current bias may be addressed by modulating the grayscale voltage polarities for a frame group which comprises a predetermined number of image frames. Specifically, the direct current bias caused by two successive frame groups may be offset by inverting the default grayscale voltage polarities for the image frames in every other frame group.

FIG. 5 shows an example where the grayscale voltage polarities for the image frames in FIG. 4 are modulated. As shown in FIG. 5, each frame group comprises 4 frames, with the frame group #1 comprising frames 1 to 4, and the frame group #2 comprising frames 5 to 8. As compared with FIG. 3, the default grayscale voltage polarities for frames 5 to 8 have been inverted, thus allowing the grayscale voltages for frames 5 to 8 to cause a direct current bias of a positive polarity. In particular, the direct current bias of the negative polarity caused by frames 1 to 4 and the direct current bias of the positive polarity caused by frames 1 to 4 offset each other, thereby addressing the issue of the direct current bias.

The above solution may however incur a new issue that the pixel luminance changes at the boundary of the frame groups. This is because the luminance of the pixel is dependent upon both the absolute value and the polarity of the grayscale voltage, and thus an alternation (inversion) of the polarity of the grayscale voltage may lead to a change in the luminance of the pixel. In particular, a significant flicker may be caused if such a change in the luminance occurs to all the pixels.

FIG. 6a shows a change in the pixel luminance without modulation of the grayscale voltage polarity. As shown in FIG. 6a, the average luminance of the pixel in every two adjacent frame period is always (P127+N255)/2. Therefore, there will be no flicker. FIG. 6b shows a change in the pixel luminance with modulation of the grayscale voltage polarity. As indicated by the bold boxes in FIG. 6b, the average luminance of the pixel in the periods of the $4^{th}$ and $5^{th}$ frames is (N255+N127)/2, being different from the average luminance of the pixel in the adjacent two frame periods before the $4^{th}$ frame, and the average luminance of the pixel in the periods of the $5^{th}$ and $6^{th}$ frames is (N127+P255)/2, being different from the average luminance of the pixel in the adjacent two frame periods after the $5^{th}$ frame. Thus, there will be a flicker.

Based on the above recognitions, embodiments of the present disclosure provide a method for driving a liquid crystal display panel, a timing controller and a liquid crystal display apparatus, to mitigate, alleviate or eliminate at least one of the issues described above.

According to a first aspect of the present disclosure, a method is provided for driving a liquid crystal display panel. The liquid crystal display panel is configured to display a sequence of image frames comprising a plurality of alternating first frame groups and second frame groups, each of the first frame groups comprising a first number of image frames, each of the second frame groups comprising a second number of image frames. The method comprises modulating grayscale voltage polarities for the plurality of first frame groups such that corresponding image frames in every two temporally adjacent first frame groups have respective grayscale voltage polarity patterns that are opposite to each other. The method further comprises modulating grayscale voltage polarities for each of the plurality of second frame groups, comprising: dividing each of the image frames in the second frame group into a first region and a second region; setting the grayscale voltage polarities for the first region to be opposite to the grayscale voltage polarities for the second region; and modulating the grayscale voltage polarities for the image frames in the second frame group such that every two successive image frames in the second frame group have respective grayscale voltage polarity patterns that are opposite to each other.

In some embodiments, the first number and the second number are even numbers.

In some embodiments, the dividing each of the image frames in the second frame group into the first region and the second region comprises dividing each of the image frames in the second frame group into the first region comprising a plurality of first sub-regions and the second region comprising a plurality of second sub-regions, the first sub-regions and the second sub-regions being arranged alternatingly. The setting the grayscale voltage polarities for the first region to be opposite to the grayscale voltage polarities for the second region comprises setting the grayscale voltage polarities for the plurality of first sub-regions to be opposite to the grayscale voltage polarities for the plurality of second sub-regions.

In some embodiments, each of the plurality of the first sub-regions comprises at least one pixel line, and each of the plurality of the second sub-regions comprises at least one pixel line.

In some embodiments, the sequence of image frames is a video signal in a progressive scanning format that is reconstructed from an interlaced scanning video signal.

In some embodiments, the method further comprises modulating the grayscale voltage polarities for the image frames in each of the plurality of first frame groups such that every two successive image frames in the first frame group have respective grayscale voltage polarity patterns that are opposite to each other.

According to a second aspect of the present disclosure, a timing controller is provided for controlling a data driver to drive a liquid crystal display panel to display a sequence of image frames, the sequence of image frames comprising a plurality of alternating first frame groups and second frame groups, each of the first frame groups comprising a first number of image frames, each of the second frame groups comprising a second number of image frames. The timing controller comprises: a control signal generator configured to generate control signals to control the data driver to perform operations comprising: modulating grayscale voltage polarities for the plurality of first frame groups such that corresponding image frames in every two temporally adjacent first frame groups have respective grayscale voltage polarity patterns that are opposite to each other; and modulating grayscale voltage polarities for each of the plurality of second frame groups, comprising: dividing each of the image frames in the second frame group into a first region and a second region; setting the grayscale voltage polarities for the first region to be opposite to the grayscale voltage polarities for the second region; and modulating the grayscale voltage polarities for the image frames in the second frame group such that every two successive image frames in the second frame group have respective grayscale voltage polarity patterns that are opposite to each other.

According to a third aspect of the present disclosure, a liquid crystal display apparatus is provided which comprises: a liquid crystal display panel comprising a pixel array and configured to display a sequence of image frames, the sequence of image frames comprising a plurality of alternating first frame groups and second frame groups, each of the first frame groups comprising a first number of image frames, each of the second frame groups comprising a second number of image frames; a data driver configured to convert grayscale data for the image frames in the sequence of image frames into grayscale voltages to be applied to the pixel array; and a timing controller comprising a control signal generator configured to control the data driver to perform operations comprising: modulating grayscale voltage polarities for the plurality of first frame groups such that corresponding image frames in every two temporally adjacent first frame groups have respective grayscale voltage polarity patterns that are opposite to each other; and modulating grayscale voltage polarities for each of the plurality of second frame groups, comprising: dividing each of the image frames in the second frame group into a first region and a second region; setting the grayscale voltage polarities for the first region to be opposite to the grayscale voltage polarities for the second region; and modulating the grayscale voltage polarities for the image frames in the second frame group such that every two successive image frames in the second frame group have respective grayscale voltage polarity patterns that are opposite to each other.

These and other aspects of the present invention will be apparent from and elucidated with reference to the embodiment(s) described hereinafter.

BRIEF DESCRIPTION OF THE DRAWINGS

FIG. 4 shows an example where a direct current bias is caused by inequality between reconstructed grayscale data and real grayscale data;

FIG. 5 shows an example of grayscale voltages applied to the pixels with modulation of the grayscale voltage polarity;

FIG. 6a shows a change in the pixel luminance without modulation of the grayscale voltage polarity;

FIG. 6b shows a change in the pixel luminance with modulation of the grayscale voltage polarity;

FIG. 7 shows an example of grayscale voltage polarity patterns of image frames that is obtained using a method according to an embodiment of the present disclosure;

FIG. 8 shows an example of the grayscale voltage polarity patterns of image frames n+1 and n+2 in FIG. 7;

DETAILED DESCRIPTION

Figures 1, 2, 3:
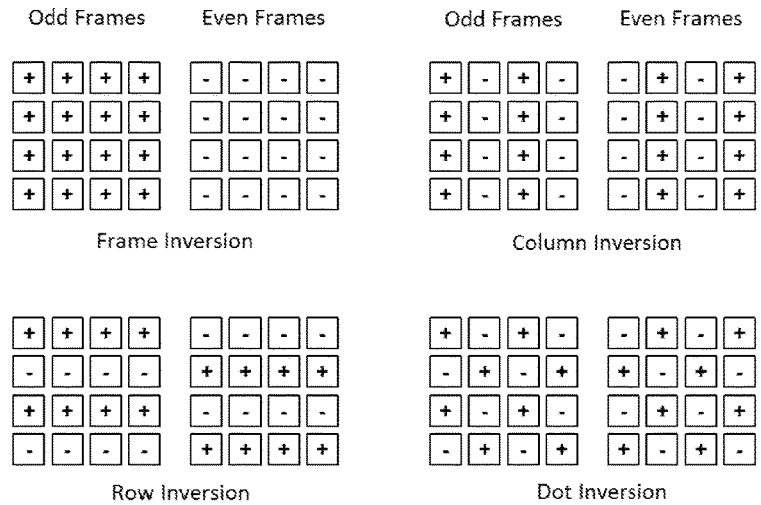
FIG. 1 shows examples of various schemes for grayscale voltage polarity inversion.
FIG. 2 shows an example of an interlaced scanning video signal for the same column of pixels in eight pixel lines in successive eight frames.
FIG. 3 shows an example of a reconstructed interlaced scanning video signal.

To render the above objectives, features and advantages of the present disclosure more apparent, embodiments of the present disclosure are described below clearly and completely in connection with the accompanying drawings. The embodiments described are merely exemplary, and should not be construed as limiting the disclosure.

FIG. 7 shows an example of grayscale voltage polarity patterns of image frames that is obtained using a method according to an embodiment of the present disclosure. The method is applicable to driving a liquid crystal display panel. The liquid crystal display panel is configured to display a sequence of image frames. The sequence of image frames comprises a plurality of alternating first frame groups and second frame groups. Each of the first frame groups comprises a first number of image frames, and each of the second frame groups comprises a second number of image frames. For simplicity of illustration, only two first frame groups #1 and one second frame group #2 are shown in FIG. 7, wherein the two first frame groups #1 comprises frames 1 to n and n+3 to 2n+2, respectively, and the second frame group #2 comprises frames n+1 and n+2.

The method comprises modulating grayscale voltage polarities for the plurality of first frame groups such that corresponding image frames in every two temporally adjacent first frame groups have respective grayscale voltage polarity patterns that are opposite to each other. In the example of FIG. 7, for the two temporally adjacent first frame groups #1, the corresponding frames 1 and n+3 have opposite grayscale voltage polarity patterns, the corresponding frames 2 and n+4 have opposite grayscale voltage polarity patterns, and the like. Similar to the modulation scheme of FIG. 5, this may offset the direct current bias of the grayscale voltages caused by the two temporally adjacent first frame groups #1.

The method further comprises modulating grayscale voltage polarities for each of the plurality of second frame groups. Specifically, each of the image frames in the second frame group is divided into a first region and a second region, the grayscale voltage polarities for the first region is set to be opposite to the grayscale voltage polarities for the second region, and the grayscale voltage polarities for the image frames in the second frame group are modulated such that every two successive image frames in the second frame group have respective grayscale voltage polarity patterns that are opposite to each other. In the example of FIG. 7, image frames n+1 and n+2 in the second frame group #2 are respectively divided into a first region and a second region, wherein the grayscale voltage polarities for the first region are set to be opposite to those for the second region. For example, for image frame n+1, the grayscale voltage polarities for the first region are set to a positive polarity P, and the grayscale voltage polarities for the second region are set to a negative polarity N; for image frame n+2, the grayscale voltage polarities for the first region are set to a negative polarity N, and the grayscale voltage polarities for the second region are set to a positive polarity P. Thus, image frames n+1 and n+2 have grayscale voltage polarity patterns that are opposite to each other.

By modulating the grayscale voltage polarities for the image frames in the frame groups #2, flickers may be reduced at the boundaries between the frame groups #1 and the frame groups #2. This is because the polarities of the grayscale voltages applied are now not changed for all the pixels, as compared with the modulation scheme of FIG. 5. For example, in the example of FIG. 7, at the boundary between the frame group #1 and the frame group #2, the second region of image frame n+1 has the same grayscale voltage polarity as image frame n (i.e., N), and the first region of image frame n+2 has the same grayscale voltage polarity as image frame n+3 (i.e., N). As the grayscale voltage polarities remain unchanged at these pixels, the pixel luminance is not changed, and thus the flickers are reduced. Moreover, since every two successive image frames in the second frame group have respective grayscale voltage polarity patterns that are opposite to each other, the polarities of the grayscale voltages applied to the respective pixels are still inverted frame by frame in the period of the second frame group. This facilitates prevention of an undue polarization of the liquid crystal.

In addition, as in conventional polarity inversion schemes, the method may further comprise modulating the grayscale voltage polarities for the image frames in each of the plurality of first frame groups such that every two successive image frames in the first frame group have respective grayscale voltage polarity patterns that are opposite to each other. In the example of FIG. 7, for the first frame groups #1, frames 1 and 2 have opposite grayscale voltage polarity patterns, frames 2 and 3 have opposite grayscale voltage polarity patterns, and the like. This may ensure that the polarities of the grayscale voltages applied to the pixels are changed frame by frame, thereby facilitating prevention of an undue polarization of the liquid crystal.

In embodiments, each first frame group #1 comprises an even number of image frames. In the example of FIG. 7, the first frame group #1 comprises 4 image frames. This may ensure that in a case where the sequence of image frames is reconstructed from an interlaced scanning video signal respective frame groups #1 have an equal number of reconstructed grayscale data and an equal number original grayscale data, such that the direct current biases of the grayscale voltages caused by two temporally adjacent frame groups #1 are completely offset. However, the present disclosure is not so limited.

In embodiments, each second frame group #2 comprises an even number of image frames. In the example of FIG. 7, the second frame group #2 comprises 2 image frames. This may ensure that in each second frame group #2 the number of the grayscale data having positive polarities is equal to the number of those having negative polarities, thus more effectively eliminating the direct current bias.

In addition, although the image frames in the first frame group #1 are shown in FIG. 7 as having grayscale voltage polarity patterns corresponding to frame inversion (i.e., the grayscale data for a whole frame has the same grayscale voltage polarity, either P or N), the present disclosure is not limited thereto. In other embodiments, the image frames in the first frame group #1 may have grayscale voltage polarity patterns corresponding to other polarity inversion schemes, such as column inversion, row inversion and dot inversion.

FIG. 8 shows an example of the grayscale voltage polarity patterns of image frames n+1 and n+2 in FIG. 7. In this example, each of image frames n+1 and n+2 is divided into a first region comprising a plurality of first sub-regions and a second region comprising a plurality of second sub-regions, with the first sub-regions and the second sub-regions being arranged alternatingly, and the grayscale voltage polarities for the plurality of first sub-regions are set to be opposite to the grayscale voltage polarities for the plurality of second sub-regions. Additionally, as shown in FIG. 8, image frames n+1 and n+2 have respective grayscale voltage polarity patterns that are opposite to each other.

In some embodiments, the first sub-region may comprise at least one pixel line, and the second sub-region may comprise at least one pixel line. The number of the pixel lines included in the first sub-region or the second sub-region may be determined from the polarity inversion scheme for the image frames in the first frame group. Further subdivision of image frames n+1 and n+2 may result in less significant flickers at the boundary between the first and second frame groups.

Figure 9:
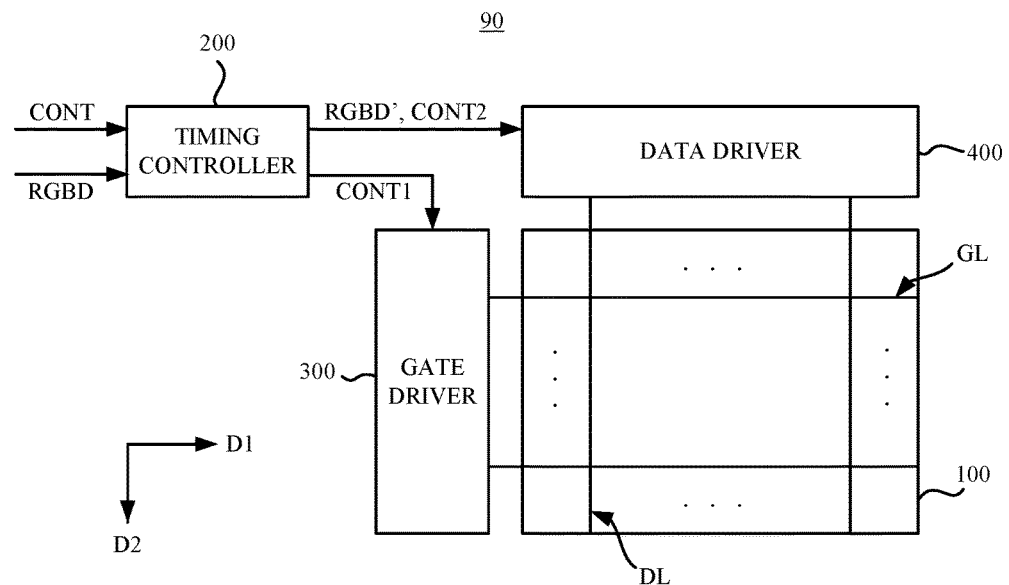
FIG. 9 shows a block diagram of a liquid crystal display apparatus according to an embodiment of the present disclosure.

FIG. 9 shows a block diagram of a liquid crystal display apparatus 90 according to an embodiment of the present disclosure.

Referring to FIG. 9, the liquid crystal display apparatus 90 comprises a display panel 100, a timing controller 200, a gate driver 300 and a data driver 400.

The display panel 100 is connected to a plurality of gate lines GL and a plurality of data lines DL. The display panel 100 displays images having a plurality of grayscales based on output image data RGBD'. The gate lines GL may extend in a first direction D1, and the data lines DL may extend in a second direction D2 intersecting (e.g., substantially perpendicular to) the first direction D1.

The display panel 100 may comprise a plurality of pixels (not shown) arranged in a matrix. Each pixel may be electrically connected to a corresponding one of the gate lines GL and a corresponding one of the data lines DL.

Each pixel may comprise a switch element, a liquid crystal capacitor and a storage capacitor. The liquid crystal capacitor and the storage capacitor may be electrically connected to the switch element. For instance, the switch element may be a thin film transistor. The liquid crystal capacitor may comprise a first electrode connected to a pixel electrode and a second electrode connected to a common electrode. The grayscale voltage may be applied to the first electrode of the liquid crystal capacitor. A common voltage may be applied to the second electrode of the liquid crystal capacitor. The storage capacitor may comprise a first electrode connected to the pixel electrode and a second electrode connected to a storage electrode. The grayscale voltage may be applied to the first electrode of the storage capacitor. A storage voltage may be applied to the second electrode of the storage capacitor. The storage voltage may be substantially equal to the common voltage.

Each pixel may be of a rectangular shape. For instance, each pixel may have a relatively short side in the first direction D1 and a relatively long side in the second direction D2. The relatively short side of each pixel may be substantially parallel to the gate lines GL. The relatively long side of each pixel may be substantially parallel to the data lines DL.

The timing controller 200 controls operations of the display panel 100, the gate driver 300 and the data driver 400. The timing controller 200 receives input image data RGBD and an input control signal CONT from an external device (such as a master device). The input image data RGBD may comprise a plurality of input grayscale data for a plurality of pixels, each of which may comprise a red grayscale data R, a green grayscale data G and a blue grayscale data B for a corresponding one of the plurality of pixels. The input control signal CONT may comprise a main clock signal, a data enabling signal, a vertical sync signal, a horizontal sync signal, and so on.

The timing controller 200 generates the output image data RGBD', a first control signal CONT1 and a second control signal CONT2 based on the input image data RGBD and the input control signal CONT.

The timing controller 200 may generate the output image data RGBD' based on the input image data RGBD. The output image data RGBD' may be provided to the data driver 400. In some embodiments, the output image data RGBD' may be image data substantially the same as the input image data RGBD. In some embodiments, the output image data RGBD' may be compensated image data generated by compensating the input image data RGBD. For example, the output image data RGBD' may be a progressive scanning video signal reconstructed from the input image data RGBD that is an interlaced scanning video signal. The output image data RGBD' may comprise a plurality of output grayscale data for a plurality of pixels.

The timing controller 200 may generate the first control signal CONT1 based on the input control signal CONT. The first control signal CONT1 may be provided to the gate driver 300, the driving timing of which may be controlled based on the first control signal CONT1. The first control signal CONT1 may comprise a vertical start signal, a gate clock signal, and so on. The timing controller 200 may generate the second control signal CONT2 based on the input control signal CONT. The second control signal CONT2 may be provided to the data driver 400, the driving timing of which may be controlled based on the second control signal CONT2. In this embodiment, the second control signal CONT2 comprises control signals to control the data driver 400 to perform various operations of the method according to embodiments of the present disclosure as described above. Furthermore, the second control signal CONT2 may comprise a horizontal start signal, a data clock signal, a data load signal, a polarity control signal, and so on.

The gate driver 300 receives the first control signal CONT1 from the timing controller 200. The gate driver 300 generates a plurality of gate signals to drive the gate lines GL based on the first control signal CONT1. The gate driver 300 may apply the plurality of gate signals sequentially to the gate lines GL.

The data driver 400 receives the second control signal CONT2 and the output image data RGBD' from the timing controller 200. The data driver 400 generates a plurality of grayscale voltages based on the second control signal CONT2 and the output image data RGBD'. The data driver 400 may apply the plurality of grayscale voltages to the data lines DL.

In some exemplary embodiments, the data driver 400 may comprise a shift register, a latch, a digital-to-analog converter and a buffer. The shift register may output a latch pulse to the latch. The latch may temporarily store the output image data RGBD', and output the output image data RGBD' to the digital-to-analog converter. The digital-to-analog converter may generate analog grayscale voltages based on the output image data RGBD', and output the analog grayscale voltages to the buffer. The buffer may output the analog grayscale voltages to the data lines DL.

In some exemplary embodiments, the gate driver 300 and/or the data driver 400 may be disposed (e.g., directly mounted) on the display panel 100, or connected to the display panel 100 in a tape carrier package (TCP). In some embodiments, the gate driver 300 and/or the data driver 400 may be integrated in the display panel 100.

By way of example, and not limitation, the liquid crystal display apparatus 90 of the embodiment may be any product or component having display functionality, such as a cellphone, a tablet, a television set, a monitor, a laptop, a digital photo frame or a navigator.

Figure 10:
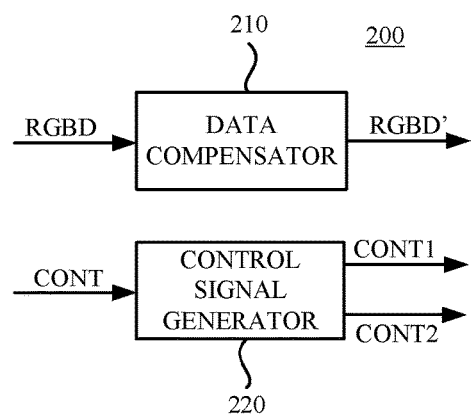
FIG. 10 shows a block diagram of the timing controller in FIG. 9.

FIG. 10 is a block diagram of the timing controller 200 in the display apparatus 90 of FIG. 9, according to an embodiment of the present disclosure.

Referring to FIG. 10, the timing controller 200 may comprise a data compensator 210 and a control signal generator 220. For ease of description, the timing controller 200 is shown in FIG. 10 as divided into two elements; however the timing controller 200 may not be physically divided.

The data compensator 210 may receive input image data RGBD from the external device and generate the output image data RGBD' by compensating the input image data RGBD. For instance, in a case where the input image data RGBD is an interlaced scanning video signal, the data compensator 210 may reconstruct, from the input image data RGBD, the output image data RGBD' that is a progressive scanning video signal with a reconstruction algorithm. In addition, the data compensator 210 may selectively perform image quality compensation, dot compensation, adaptive color correction (ACC) and/or dynamic capacitance compensation (DCC) for the input image data RGBD, to generate the output image data RGBD'.

In some exemplary embodiments, the data compensator 210 may comprise a single line memory which stores grayscale data for a single pixel line.

The control signal generator 220 may receive the input control signal CONT from the external device and generate, based on the input control signal CONT, the first control signal CONT1 for the gate driver 300 in FIG. 9 and the second control signal CONT2 for the data driver 400 in FIG. 9. The control signal generator 220 may output the first control signal CONT1 to the gate driver 300 in FIG. 9 and output the second control signal CONT2 to the data driver 400 in FIG. 9.

In particular, the control signal generator 220 controls the data driver 400 to perform the various operations of the method according to embodiments of the present disclosure as described above by outputting the second control signal CONT2 to the data driver 400. These operations have been described above in detail with respect to FIGS. 7 and 8, and thus are not repeated here for simplicity.

The foregoing are merely specific embodiments of the present disclosure, to which the scope of the disclosure is however not limited. Any variation or substitution that easily occurs to those skilled pertaining to the art who have read this technical disclosure should be encompassed in the scope of the disclosure. Thus, the scope of the present disclosure is defined by the claims.

What is claimed is:

1. A method for driving a liquid crystal display panel, the liquid crystal display panel configured to display a sequence of image frames comprising a plurality of alternating first frame groups and second frame groups, each of the first frame groups comprising a first number of image frames, each of the second frame groups comprising a second number of image frames, the method comprising:
    modulating grayscale voltage polarities for the plurality of first frame groups such that corresponding image frames in every two temporally adjacent first frame groups have respective grayscale voltage polarity patterns that are opposite to each other; and
    modulating grayscale voltage polarities for each of the plurality of second frame groups, comprising:
        dividing each of the image frames in the second frame group into a first region and a second region;
        setting the grayscale voltage polarities for the first region to be opposite to the grayscale voltage polarities for the second region; and
        modulating the grayscale voltage polarities for the image frames in the second frame group such that every two successive image frames in the second frame group have respective grayscale voltage polarity patterns that are opposite to each other,
    wherein the dividing each of the image frames in the second frame group into the first region and the second region comprises dividing each of the image frames in the second frame group into the first region comprising a plurality of first sub-regions and the second region comprising a plurality of second sub-regions, the first sub-regions and the second sub-regions being arranged alternatingly, and
    wherein the setting the grayscale voltage polarities for the first region to be opposite to the grayscale voltage polarities for the second region comprises setting the grayscale voltage polarities for the plurality of first sub-regions to be opposite to the grayscale voltage polarities for the plurality of second sub-regions.

2. The method of claim 1, wherein the first number and the second number are even numbers.

3. The method of claim 1, wherein each of the plurality of the first sub-regions comprises at least one pixel line, and wherein each of the plurality of the second sub-regions comprises at least one pixel line.

4. The method of claim 1, wherein the sequence of image frames is a video signal in a progressive scanning format that is reconstructed from an interlaced scanning video signal.

5. The method of claim 1, further comprising modulating the grayscale voltage polarities for the image frames in each of the plurality of first frame groups such that every two successive image frames in the first frame group have respective grayscale voltage polarity patterns that are opposite to each other.

6. A timing controller for controlling a data driver to drive a liquid crystal display panel to display a sequence of image frames, the sequence of image frames comprising a plurality of alternating first frame groups and second frame groups, each of the first frame groups comprising a first number of image frames, each of the second frame groups comprising a second number of image frames, the timing controller comprising:
    a control signal generator configured to generate control signals to control the data driver to perform operations comprising:
        modulating grayscale voltage polarities for the plurality of first frame groups such that corresponding image frames in every two temporally adjacent first frame groups have respective grayscale voltage polarity patterns that are opposite to each other; and modulating grayscale voltage polarities for each of the plurality of second frame groups, comprising:
dividing each of the image frames in the second frame group into a first region and a second region;
setting the grayscale voltage polarities for the first region to be opposite to the grayscale voltage polarities for the second region; and
modulating the grayscale voltage polarities for the image frames in the second frame group such that every two successive image frames in the second frame group have respective grayscale voltage polarity patterns that are opposite to each other,
wherein the dividing each of the image frames in the second frame group into the first region and the second region comprises dividing each of the image frames in the second frame group into the first region comprising a plurality of first sub-regions and the second region comprising a plurality of second sub-regions, the first sub-regions and the second sub-regions being arranged alternatingly, and
wherein the setting the grayscale voltage polarities for the first region to be opposite to the grayscale voltage polarities for the second region comprises setting the grayscale voltage polarities for the plurality of first sub-regions to be opposite to the grayscale voltage polarities for the plurality of second sub-regions.

7. The timing controller of claim 6, wherein the first number and the second number are even numbers.

8. The timing controller of claim 6, wherein each of the plurality of the first sub-regions comprises at least one pixel line, and wherein each of the plurality of the second sub-regions comprises at least one pixel line.

9. The timing controller of claim 6, further comprising a data compensator configured to receive an interlaced scanning video signal and reconstruct from the interlaced scanning video signal the sequence of image frames in a progressive scanning format.

10. The timing controller of claim 6, wherein the control signal generator is further configured to control the data driver to perform an operation of modulating the grayscale voltage polarities for the image frames in each of the plurality of first frame groups such that every two successive image frames in the first frame group have respective grayscale voltage polarity patterns that are opposite to each other.

11. A liquid crystal display apparatus, comprising:
a liquid crystal display panel comprising a pixel array and configured to display a sequence of image frames, the sequence of image frames comprising a plurality of alternating first frame groups and second frame groups, each of the first frame groups comprising a first number of image frames, each of the second frame groups comprising a second number of image frames;
a data driver configured to convert grayscale data for the image frames in the sequence of image frames into grayscale voltages to be applied to the pixel array; and
a timing controller comprising a control signal generator configured to control the data driver to perform operations comprising:
modulating grayscale voltage polarities for the plurality of first frame groups such that corresponding image frames in every two temporally adjacent first frame groups have respective grayscale voltage polarity patterns that are opposite to each other; and
modulating grayscale voltage polarities for each of the plurality of second frame groups, comprising:
dividing each of the image frames in the second frame group into a first region and a second region;
setting the grayscale voltage polarities for the first region to be opposite to the grayscale voltage polarities for the second region; and
modulating the grayscale voltage polarities for the image frames in the second frame group such that every two successive image frames in the second frame group have respective grayscale voltage polarity patterns that are opposite to each other,
wherein the dividing each of the image frames in the second frame group into the first region and the second region comprises dividing each of the image frames in the second frame group into the first region comprising a plurality of first sub-regions and the second region comprising a plurality of second sub-regions, the first sub-regions and the second sub-regions being arranged alternatingly, and
wherein the setting the grayscale voltage polarities for the first region to be opposite to the grayscale voltage polarities for the second region comprises setting the grayscale voltage polarities for the plurality of first sub-regions to be opposite to the grayscale voltage polarities for the plurality of second sub-regions.

12. The liquid crystal display apparatus of claim 11, wherein the timing controller further comprises a data compensator configured to receive an interlaced scanning video signal and reconstruct from the interlaced scanning video signal the sequence of image frames in a progressive scanning format.

13. The liquid crystal display apparatus of claim 11, wherein the control signal generator is further configured to control the data driver to perform an operation of modulating the grayscale voltage polarities for the image frames in each of the plurality of first frame groups such that every two successive image frames in the first frame group have respective grayscale voltage polarity patterns that are opposite to each other.

14. The liquid crystal display apparatus of claim 12, wherein the control signal generator is further configured to control the data driver to perform an operation of modulating the grayscale voltage polarities for the image frames in each of the plurality of first frame groups such that every two successive image frames in the first frame group have respective grayscale voltage polarity patterns that are opposite to each other.

15. The method of claim 2, further comprising modulating the grayscale voltage polarities for the image frames in each of the plurality of first frame groups such that every two successive image frames in the first frame group have respective grayscale voltage polarity patterns that are opposite to each other.

16. The method of claim 3, further comprising modulating the grayscale voltage polarities for the image frames in each of the plurality of first frame groups such that every two successive image frames in the first frame group have respective grayscale voltage polarity patterns that are opposite to each other.

17. The method of claim 4, further comprising modulating the grayscale voltage polarities for the image frames in each of the plurality of first frame groups such that every two successive image frames in the first frame group have respective grayscale voltage polarity patterns that are opposite to each other.

* * * * *